(12) United States Patent  
McCaughan et al.

(10) Patent No.: US 8,134,460 B2  
(45) Date of Patent: Mar. 13, 2012

(54) RELATIVE POSITIONING SYSTEM METHOD

(75) Inventors: Ann K. McCaughan, Las Vegas, NV (US); Andrew Pal, Las Vegas, NV (US); Brad McGrath, Las Vegas, NV (US)

(73) Assignee: Noninvasive Medical Technologies, Inc., Las Vegas, NV (US)

( * ) Notice: Subject to any disclaimer, the term of this patent is extended or adjusted under 35 U.S.C. 154(b) by 251 days.

(21) Appl. No.: 12/383,361

(22) Filed: Mar. 23, 2009

(65) Prior Publication Data

US 2009/0237235 A1    Sep. 24, 2009

Related U.S. Application Data

(63) Continuation-in-part of application No. PCT/US2007/020486, filed on Sep. 21, 2007.

(60) Provisional application No. 60/846,407, filed on Sep. 21, 2006, provisional application No. 60/846,827, filed on Sep. 21, 2006, provisional application No. 60/974,003, filed on Sep. 20, 2007.

(51) Int. Cl.  
*G08B 1/08* (2006.01)

(52) U.S. Cl. ................................. 340/539.12

(58) Field of Classification Search ............. 340/539.12, 340/539.1, 539.13, 407.1, 572.1, 573.1, 539.11, 340/10.1  
See application file for complete search history.

(56) References Cited

U.S. PATENT DOCUMENTS

| | | | |
|---|---|---|---|
| 4,981,141 A | 1/1991 | Segalowitz | |
| 5,068,886 A | 11/1991 | Lavia | |
| 5,309,917 A | 5/1994 | Wang et al. | |
| 5,423,326 A | 6/1995 | Wang et al. | |
| 5,443,073 A | 8/1995 | Wang et al. | |
| 5,945,950 A | 8/1999 | Elbadawy | |
| 6,317,094 B1 | 11/2001 | Wu et al. | |
| 6,370,433 B1 | 4/2002 | Hartlaub et al. | |
| 6,409,675 B1 | 6/2002 | Turcott | |
| 6,411,826 B1 | 6/2002 | Camp, Jr. | |
| 6,600,949 B1 | 7/2003 | Turcott | |
| 6,752,277 B1 | 6/2004 | Sempliner | |
| 6,977,579 B2 * | 12/2005 | Gilfix et al. | 340/407.1 |
| 7,034,685 B2 * | 4/2006 | Fabre et al. | 340/572.1 |

(Continued)

FOREIGN PATENT DOCUMENTS

WO    WO-2008036396    3/2008

(Continued)

OTHER PUBLICATIONS

Office Action issued Apr. 5, 2011 in U.S. Appl. No. 12/383,358.

*Primary Examiner* — Phung Nguyen (74) *Attorney, Agent, or Firm* — Panitch Schwarze Belisario & Nadel LLP (57) ABSTRACT

A relative positioning system and method has an adjoining pair of spaced apart receivers positioned proximal to an object causing a signal interference with a radio frequency signal detectable by each receiver of the adjoining pair. The radio frequency signal is associated with an emitter. Control electronics operatively couple the spaced apart receivers. The control electronics are configured to determine a direction of the emitter based on the signal interference. In an embodiment of the system and method the emitter is associated with an object of interest, the signal encodes information relating to the identity and status of the object, and information and heading of the object are cutaneously communicated to an operator by an article worn by the operator.

16 Claims, 5 Drawing Sheets

U.S. PATENT DOCUMENTS

| | | |
|---|---|---|
| 7,099,631 B2 | 8/2006 | Lee et al. |
| 7,242,293 B2 * | 7/2007 | Rea et al. ............... 340/539.11 |
| 7,248,171 B2 * | 7/2007 | Mishelevich ............ 340/573.1 |
| 7,474,918 B2 | 1/2009 | Frantz et al. |
| 7,656,290 B2 * | 2/2010 | Fein et al. ............... 340/539.13 |
| 7,768,409 B2 * | 8/2010 | Parias ...................... 340/573.1 |
| 7,911,324 B2 * | 3/2011 | Breed et al. ................ 340/10.1 |
| 2002/0054412 A1 | 5/2002 | Keller et al. |
| 2006/0016800 A1 | 1/2006 | Paradiso et al. |
| 2006/0044112 A1 * | 3/2006 | Bridgelall ................... 340/10.1 |
| 2006/0109180 A1 | 5/2006 | Fukuda |

FOREIGN PATENT DOCUMENTS

| | | |
|---|---|---|
| WO | WO-2008036402 | 3/2008 |
| WO | WO-2008036404 | 3/2008 |
| WO | WO-2008105837 | 9/2008 |

* cited by examiner

RELATIVE POSITIONING SYSTEM METHOD

CROSS-REFERENCE TO RELATED APPLICATIONS

This application is a continuation-in-part of PCT/US2007/020486 filed Sep. 21, 2007, entitled "Relative Positioning System And Method" and claims the benefit of priority of related to U.S. Provisional Patent Application No. 60/846,407, entitled "Wearable Multi-sensory Medical Display", filed Sep. 21, 2006, U.S. Provisional application No. 60/846,827, entitled "Advanced Dynamic Relative Positioning", filed Sep. 21, 2006, U.S. Provisional application No. 60/974,003 entitled "Wearable Relative Positioning System and Method", filed Sep. 20, 2007. Each of the above-identified related applications is incorporated herein by reference.

STATEMENT REGARDING FEDERALLY RESEARCH OR DEVELOPMENT

The U.S. Government has a paid-up license in this invention and the right in limited circumstances to require the patent owner to license others on reasonable terms to the extent and under the provisions as provided for by the terms of Contract No. DAH001-05-S-0144 awarded by the U.S. Air Force Special Operations Command (AFSOC).

BACKGROUND OF THE INVENTION

Dynamic environments, and in particular emergency or catastrophic environments, subject those present to extreme and hostile conditions in which to accomplish specific missions or task requiring the location and the assessment of the status of objects of interest. One example of a representative mission requiring real time, dynamic relative positioning is that of an emergency medical technician or other emergency care provider. An alternative, but no less equally important mission, includes the need for members of a relief team responding to a natural disaster (e.g., a hurricane or earthquake) to maintain situation awareness of the environment at all times and in all conditions (e.g., poor visibility), and in particular to locate, treat, and monitor casualties and where appropriate to locate, track and monitor other team member activities.

To achieve mission success during catastrophes or other extremely high workload conditions, a emergency medical technician or other emergency care provider must receive large amounts of casualty medical information, and is required to maintain situation awareness of the battlefield environment at all times and in all conditions. All prior solutions have used two dimensional visual displays (for example, Personal Digital Assistants or laptops) to display the casualty medical information. These current visual displays demand the operator's visual attention that can compromise mission effectiveness, and operations in low light visibility environments can cause fatigue, degrade performance, and compromise clandestine operations. The operator could be much more effective and efficient if his eyes were used to survey his surroundings rather than continuously monitoring a visual display.

Accordingly, there is a need in the art for a device that enhances the ability of the emergency medical technician or other operator to locate, assess, track and monitor objects of interest (including but not limited to casualties) in a dynamic environment.

SUMMARY OF THE INVENTION

Briefly stated, one aspect of the present invention is a relative positioning system comprising an adjoining pair of spaced apart receivers positioned proximal to an object causing a signal interference with a radio frequency signal detectable by each receiver of the adjoining pair, the radio frequency signal associated with an emitter. Control electronics operatively couples the spaced apart receivers. The control electronics is configured to determine a direction of the emitter based on the signal interference.

Another aspect of the present invention is a method for determining a relative position comprising the steps of: positioning an adjoining pair of spaced apart receivers proximal to an object causing a signal interference with a radio frequency signal detectable by each receiver of the adjoining pair, the radio frequency signal associated with an emitter, the spaced apart receivers being operatively coupled by control electronics; and determining a direction of the emitter based on the signal interference.

Another aspect of the present invention is a relative positioning system for determining a heading of an object emitting a signal having a signal strength. The system comprises a plurality of receivers, each receiver able to receive the signal from the object. A two-dimensional, body-centered coordinate system is formed by the plurality of receivers. Control electronics operatively couples the plurality of receivers. The control electronics are configured to produce a directional cue corresponding to the heading of the object based on the strength of the signal received by each of the plurality of receivers.

Another aspect of the present invention is a method for determining a heading of an object emitting a signal having a signal strength. The method comprises the steps of: forming a two-dimensional, body-centered coordinate system formed with a plurality of receivers, each receiver able to receive the signal from the object, the plurality of receivers being operatively coupled by control electronics; and producing with the control electronics a directional cue corresponding to the heading of the object based on the strength of the signal received by each of the plurality of receivers.

Another aspect of the present invention is a method for achieving operator awareness of a casualty in an emergent environment, the casualty having a heading with respect to the operator and emitting a signal having a strength. The method comprises the steps of: positioning on the operator a wearable article supporting a two-dimensional, body-centered coordinate system formed by a plurality of receivers and a plurality of stimulus generators, each receiver of the plurality of receivers able to receive the signal from the casualty, each signal generator of the plurality of stimulus generators able to generate a stimulus perceptible to the operator, the plurality of receivers operatively coupled to the plurality of stimulus generators by control electronics; detecting with the plurality of receivers the signal emitted by the casualty; determining the heading of the casualty in the body-centered coordinate system; and communicating to the operator a directional cue corresponding to the heading, the directional cue generated by one stimulus generator of the plurality of stimulus generators.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIGS. 4(a), (b) and (c) are graphic representations of the differential degradation in the strength of the signal detected by three pairs S1, S2, S3 of the plurality of receivers in accordance with the embodiment of FIG. 2;

DETAILED DESCRIPTION OF THE INVENTION

Certain terminology is used in the following description for convenience only and is not limiting. For example, the words "right," "left," and "front" designate directions in the drawings to which reference is made. The terminology includes the words noted above, derivatives thereof and words of similar import.

Broadly stated, the present invention relates to a system and method for determining the position of one or more objects of interest in dynamic environments. More specifically, the present invention includes a wearable relative positioning system for determining relative to the body of an operator a wearing the system heading of the objects of interest in the dynamic environments and for maintaining an awareness of the status of the objects of interest.

One aspect of the invention is a relative positioning system comprising an adjoining pair of spaced apart receivers 16 positioned proximal to an object causing a signal interference with a radio frequency signal 12 detectable by each receiver of the adjoining pair. The radio frequency signal 12 is associated with an emitter 22 attached to a distal object of interest. Control electronics 20 operatively couples the spaced apart receivers 16. The control electronics 20 is configured to determine a direction of the emitter 22 based on the signal interference.

Referring to the drawings in detail, where like numerals indicate like elements throughout, there is indicated a relative positioning system is wearable by an operator. In the figures and disclosure to follow, the wearable, relative positioning system is generally designated 10 and hereinafter referred to as the RPS 10 in accordance with the present invention. The RPS 10 determines relative to a body of an operator or object wearing or supporting the RPS 10, a heading of an object emitting a signal 12 having a signal strength. The RPS 10 is not limited to being worn by a person. The body on which the RPS 10 may be mounted or attached includes animate and inanimate objects such as search dogs, robots, and autonomous unmanned vehicles.

For brevity, the RPS 10 is described below using an example of ascertaining the location and status of scattered, multiple casualties, for example, from a major accident or other catastrophe, and when necessary, to treat the most critical casualties on a priority basis. Accordingly, in the context of the example, the operator is a emergency medical technician or physician or the like and the object of interest is a casualty. However, the invention is not limited to such a mission nor is it limited to a casualty situation. For example, as stated above, broadly viewed, the present invention relates to a system and method for locating and maintaining the awareness of one or more objects of interest in dynamic environments.

The RPS 10 preferably comprises an article 14 wearable on the body of the operator. The article 14 may be mounted on any wearable structure, such as a belt, a vest, or even a cap, a glove or other garment that enables cutaneous communication to the operator. Preferably, the RPS 10 is configured as a casualty tracker system ensemble (CSTE) belt or simply "casualty belt" to be worn about an operator's waist.

The RPS 10 comprises a plurality of receivers 16 and a plurality of stimulus generators 18 operatively coupled by control electronics 20. Each receiver of the plurality of receivers 16 and each stimulus generator of the plurality of stimulus generators 18 is preferably supported by the wearable article 14. Each receiver 16 is able to receive the signal 12 from the object. Preferably the signal 12 is a radio frequency (RF) signal and at least three RF receivers 16a, 16b, 16c are provided. The receivers 16 may be any of a wide variety of conventional radio frequency (RF) receivers adapted to the desired form factor and configured to receive an RF signal. Preferably, the RF signal emanates from an electronic tag (also "Etag" or "E-Tag") 22 attached to the object of interest, which for the major accident example could be a casualty. The electronic tag 22 may be any of a wide variety of emitters able to transmit an RF signal receivable and decodable by the receivers 16 and their associated control electronics 20. At least one receiver of the plurality of receivers 16 may be configured to interrogate the electronic tag 22 and in response to the interrogation, the signal 12 emitted from the electronic tag 22. The electronic tags 22 may also be operatively coupled to status sensors (not shown) on the object which in the case of a casualty may provide the status of vital signs. Typically the RF signal encodes and communicates information representing the identification and status of the object in a form the control electronics 20 can process.

The stimulus generators 18 may be any of a wide variety of stimulus generators, each able to generate a stimulus perceptible to the operator. Desirably the stimulus generators are tractors, and preferably are any of a wide variety of vibrotactile stimulators adapted to the desired form factor and configured to provide cutaneous communication to the operator. Alternatively, the stimulus generators may be replaced by other perceptible stimulus generator able to communicate two-dimensional directional cueing.

Figures 3, 4, 7A, 7B:
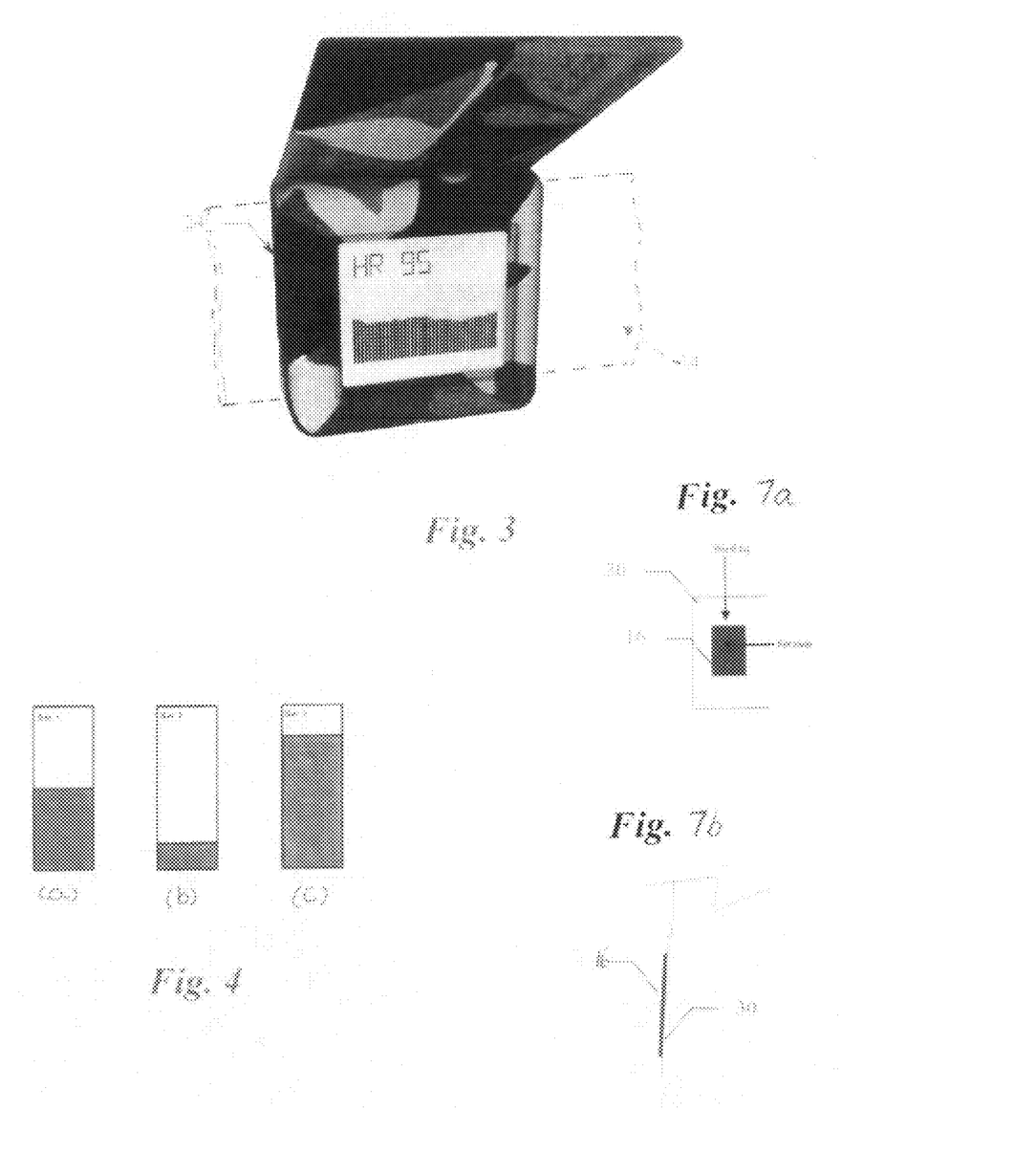
FIG. 3 is a digital image of a wearable pod housing a portion of the embodiment of FIG. 1.
FIG. 7a and 7b are a schematic diagrams (front and side) of a preferred embodiment of a receiver with shielding in accordance with the present invention.

For example, in certain applications and environments where audible or visible communications are permissible, the cutaneous communication may be replaced or augmented by audible or visible signals. In such applications and environments, the control electronics 20 of the RPS 10 may provide audible communication by being operatively coupled to an audible signal generator or may provide visual communication by being operatively coupled to an LCD display able to provide a visible heading indicator and also to provide detail regarding a casualty's vital signs, such as heart rate or medical status (e.g., guarded, stable, critical, etc.) or both. Referring to FIG. 3, in a preferred embodiment, the RPS 10 includes an enclosure 24 or pod housing the control electronics 20. The pod 24 may be removably attachable to a belt 14 (partially depicted in phantom) or to the operator's wrist to enable the operator to easily access the operator interface integrated into the pod.

Figure 1:
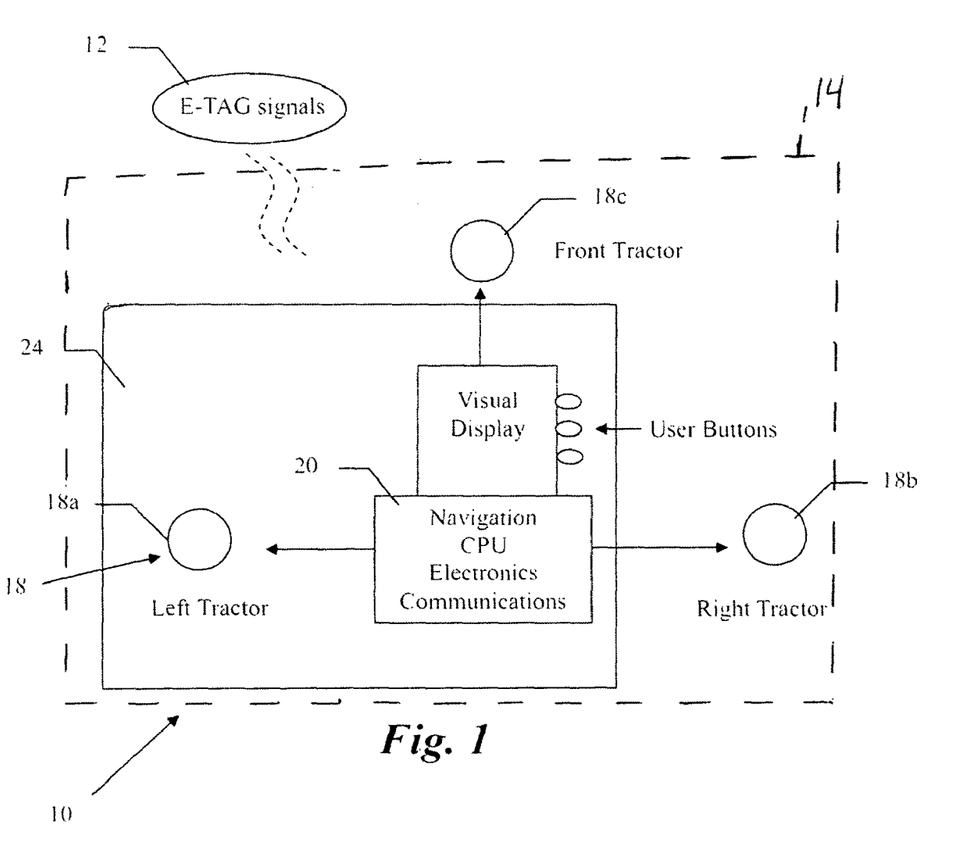
FIG. 1 is a schematic diagram of a preferred embodiment of the wearable relative positioning system in accordance with the present invention.
Figure 2:
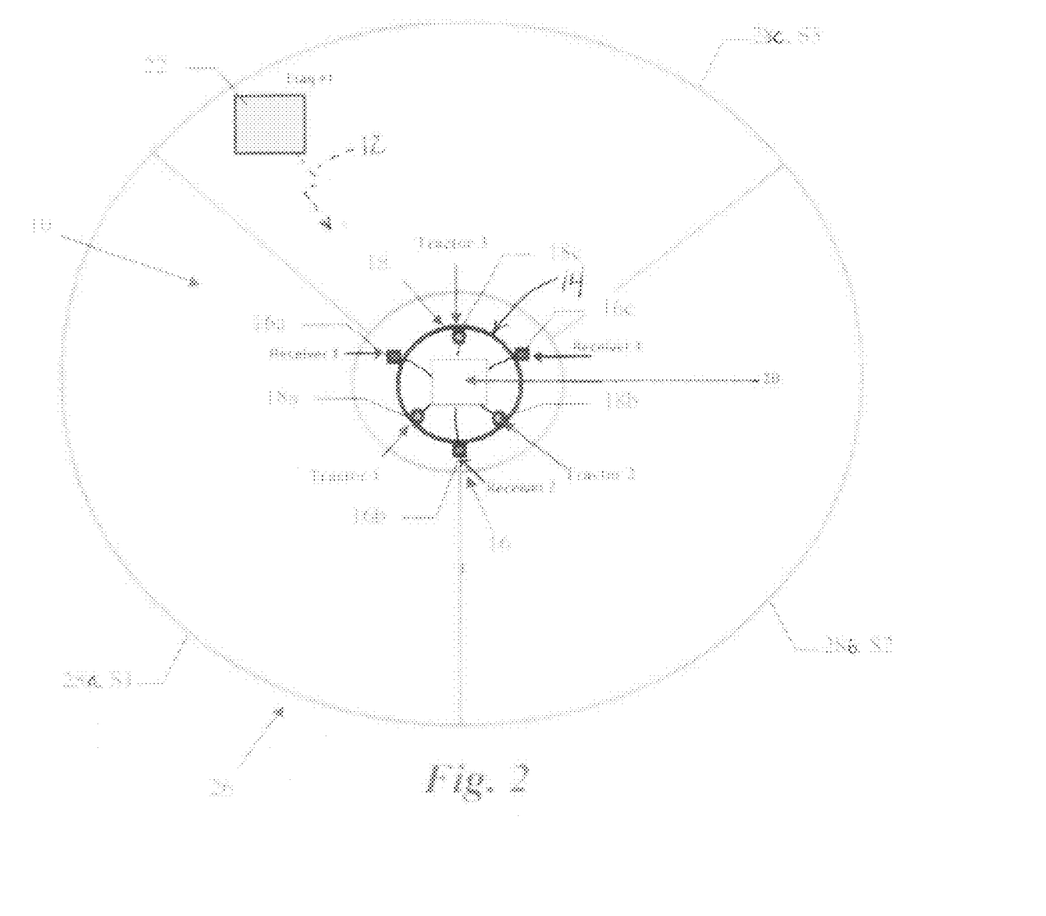
FIG. 2 is a schematic diagram of the of the embodiment of FIG. 1 showing the sectors of the two-dimensional, body-centered coordinate system.

Referring to FIG. 2, a two-dimensional, body-centered coordinate system indicated generally at 26 is formed by the plurality of receivers 16. Preferably, the plurality of receivers 16 and a plurality of stimulus generators 18 are arranged such that they are uniformly spaced with a separate stimulus generator of the plurality of stimulus generators 18 positioned between each adjoining pair of receivers of the plurality of receivers 16. The two-dimensional, body-centered coordinate system 26 comprises a plurality of sectors 28. Each sector 28a, 28b, 28c, respectively is defined by an adjoining pair S1, S2, S3 of spaced apart receivers 16a, 16b, 16c of the plurality of receivers 16. A separate stimulus generator 18a, 18b, 18c of the plurality of stimulus generators 18 is positioned in each sector 28a, 28b, 28c, respectively.

Figure 8:
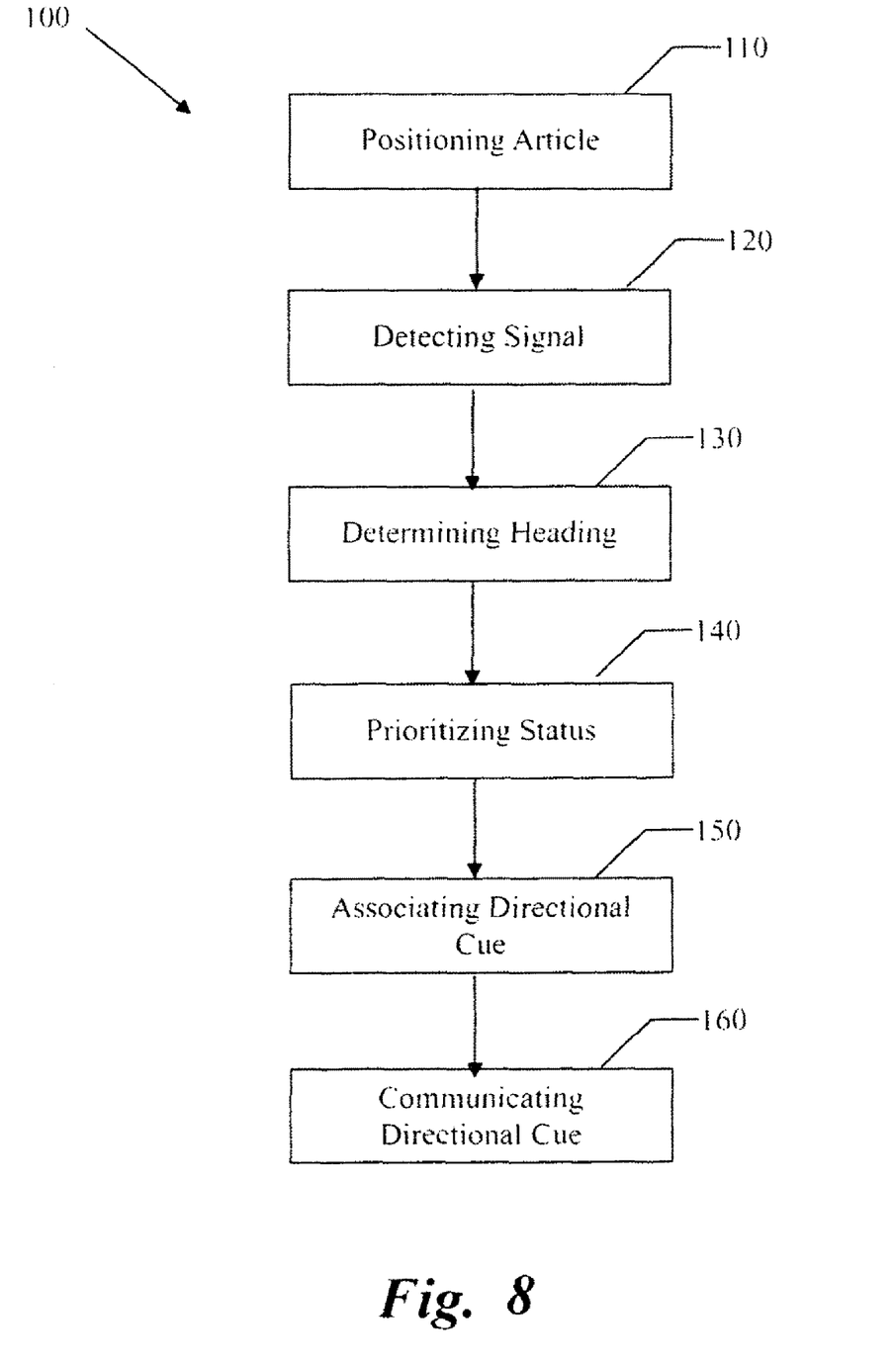
FIG. 8 is a functional flow diagram of the steps of a preferred embodiment of a method for achieving operator awareness of a casualty in an emergent environment in accordance with the present invention.

The control electronics 20 is configured to cause one stimulus generator of the plurality of stimulus generators 18 to communicate to the operator a directional cue corresponding to the heading of the object with the emitter 22. In a preferred embodiment, the directional cue is determined by a trigger algorithm based on a differential degradation in the strength of the signal detected by the plurality of receivers 16 as further discussed below. The differential degradation is caused by the interaction of the signal with the body of the operator. As shown in FIG. 8, the differential degradation of the signal may be enhanced by shielding 30 located between the body of the operator and at least one of the receivers of the plurality of receivers 16.

The control electronics 20 causes the one of the stimulus generators 18 to communicate the directional cue to the operator by executing a trigger algorithm based on a sum of the strength of the signal received by each of the receivers 16 of each adjoining pair of spaced apart receivers defining the sector in which the signal emanates.

The receivers and signal generators may be operatively coupled (either by wire, fiber or wirelessly) to control electronics 20 housed in a pod, such as the pod shown in FIG. 3. Alternatively, the control electronics 20 may comprise a plurality of loosely coupled autonomous agents. Each agent may be able to communicate with each other agent. At least one agent may be uniquely associated with one receiver of the plurality of receivers 16 or with one stimulus generator of the plurality of signal generators 18.

Referring to FIG. 2, in a preferred embodiment, the plurality of receivers 16 comprises a first receiver 16a, a second receiver 16b and a third receiver 16c and the plurality of stimulus generators 18 comprises a first tractor 18a, a second tractor 18b, and a third tractor 18c. The plurality of receivers 16 and the plurality of stimulus generators 18 are uniformly spaced with a tractor 18a, 18b, 18c positioned between each adjoining pair 16a: 16b, 16b: 16c, 16c: 16a of receivers. As shown in FIG. 2, the arrangement of the adjoining pairs of receivers provides three sectors or sections (left 28a, right 28b and front 28c) for directional cueing. Receivers 16a and 16b, acting as a pair S1, form signal strength collector (Set 1) for the left sector 28a; receivers 16b and 16c, acting as a pair S2, form a signal strength collector (Set 2) for the right sector 28b; and receivers 16c and 16a, acting as a pair S3, form a signal strength collector (Set 3) for the front sector 28c. For each sector, the sum of the signals received by the corresponding pair (or Set S) of receivers provides the basis for determining whether a signal is arriving from that sector. Additional receivers and tractors may be provided to increase the number of sectors, the number depending on the desired resolution for the directional cueing.

FIG. 2 schematically shows a radio signal source in the form of an electronic tag 22 in the focus of the front sector 28c. The bars in FIG. 4 show the combined strength of the signal 12 for each of the receiver pairs (sets): S1 (16a:16b); S2 (16b:16c); S3 (16c:16a), due to the presence of electronic tag 22. Pair set S3 in this example receives the strongest signal. Directional cueing is provided by actuating the stimulus generator (or tractor) 18c associated with the front sector 28c and pair set S3 in response to a trigger algorithm employing the simple logic for analyzing relative signal strength.

In FIG. 2, the receivers 16a, 16b, 16c and the stimulus generators (or tractors) 18a, 18b, 18c are uniformly spaced from one another. The presence of the emitter 22 in the sector defined by the receiver pair 16a, 16c causes the tractor 18c to fire as the sum R1+R3 of the strength of the signals received by the set 3 receiver pair 16a, 16c (FIG. 4(c)) is greater than the sum R1+R2 of the strength of the signals received by the set 1 receiver pair 16a, 16b (FIG. 4(a)) and also is greater than the sum R2+R3 of the strength of the signals received by the set 2 receiver pair 16b, 16c (FIG. 4(b)). The activation (firing) of tractor 18c provides the directional cue for the heading (or relative position) of electronic tag 22, as the signal strength of Set 3 is greater than the strength of the signal received by both Set 1 and Set 2. As stated above the trigger logic may be executed by a central processor or by logic circuits associated with each receiver and/or tractor.

Figure 5:
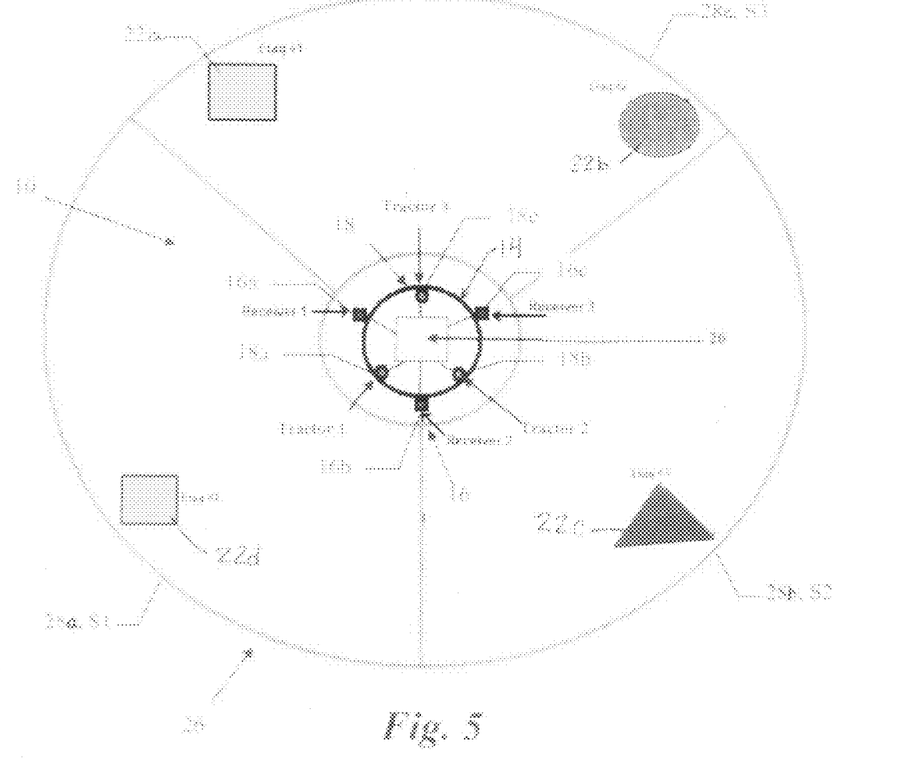
FIG. 5 is a schematic diagram of the embodiment of FIG. 2 showing the sectors of the two-dimensional, body-centered coordinate system for an environment having a plurality of casualties.
Figure 6:
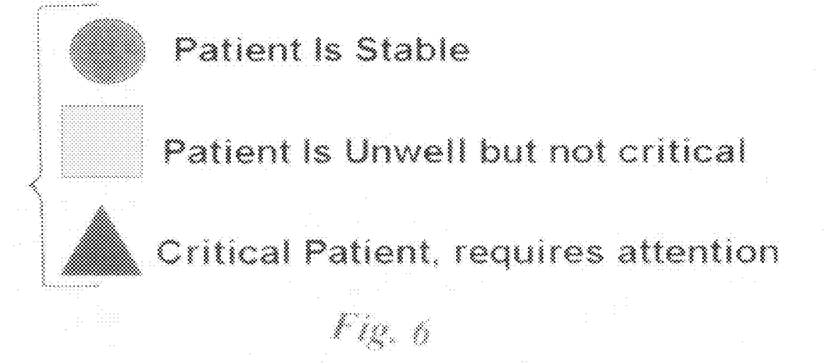
FIG. 6 is an example of a preferred scheme for prioritizing the status of casualties in accordance with the present invention.

Referring to FIGS. 5 and 6, in environments where multiple independently identifiable electronic tags 22a, 22b, 22c, 22d, each associated with a different object, are present in the mission environment, a preferred embodiment of the invention may be configured to provide situation awareness of not only the heading of each of the objects but also the status. The individual possible status codes for such casualty are defined in FIG. 6. They can be employed on a visual operator display using shape or color codes or both, if provided. FIG. 5 schematically represents such a situation in the major accident example above. Depicted in FIG. 5 are the electronic tags 22a, 22b, 22c, 22d associated with four different casualties (or patients). The casualty corresponding to electronic tag 22b is in stable condition (green/circle). The casualties corresponding to electronic tag 22a and electronic tag 22d are not well but also are not in critical condition (yellow/squares). The casualty corresponding to electronic tag 22c is in critical condition and requires attention (red/triangle).

As the RF signals transmitted by each of the electronic tags preferably include a unique identification number and also casualty status information, this embodiment of the RPS 10 determines in the manner discussed above the directional heading of each casualty. Further software executed by the control electronics prioritizes the casualty location and determines the criticality of the casualty. The software then determines the tactile algorithm and visual indicator to be communicated to the operator. For example, for a stable casualty, the tactile signal is a low intensity signal and the visual indicator is a green circle. For an emergent casualty (unwell but not critical) the tactile signal is a medium intensity signal and the visual indicator is a yellow square. For a serious casualty (critical), the tactile signal is a high intensity signal and the visual indicator is a red triangle. Preferably, only the most critical casualty (-ies) is/are displayed using the tactile display while the entire battlefield casualty status is displayed a visual display. In summary, if the casualty is in the right rear sector and has a status of critical, the tractor located between the adjoining receiver pairs defining the sector will activate at a high intensity and a red triangle will appear on the visual display of the RPS 10. Alternatively, audible cues varying in tone or intensity based on the severity of the medical status may be communicated to the operator instead of or in addition to the visual cues.

Further, in accordance with a rule based updating paradigm, such as update the status of stable casualties every 120 seconds, unwell but not critical casualties every 60 seconds, and critical casualties every 10 seconds, situational awareness for multiple casualties is achieved by automatic tactor firings based on the incoming update frequencies. Updates could be generated automatically from the electronic tag, if it is configured to process status information from the casualty or other object of interest, from the control electronics 20 based on data from the electronic tag(s) processed by the control electronics to ascertain electronic tag wearer medical status or entered manually by the belt wearer.

The electronic tags 22 may be transponder-like devices that only transmit when interrogated and the receivers may be configured to interrogate the transponders at predetermined or operator selectable intervals.

A more detailed description of another aspect of the invention is discussed below in the context of the major accident mission described above.

FIG. 8 illustrates a method for achieving operator awareness of a casualty in an emergent environment, generally designated 100, and hereinafter referred to as the casualty tracking method 100. The casualty to which the casualty tracking method 100 is directed has a heading with respect to the operator and emits a signal 12 having a strength. Preferably, the signal 12 encodes information representing the identity of the casualty and the vital signs of the casualty.

The casualty tracking method 100 comprises a positioning step 110 in which a wearable article, such as the article 14 described above, is positioned on the operator. The article supports a two-dimensional, body-centered coordinate system 26 formed by a plurality of receivers 16 and a plurality of stimulus generators 18. Each receiver of the plurality of receivers 16 is able to receive the signal 12 from the casualty. Each signal generator of the plurality of stimulus generators 18 is able to generate a stimulus perceptible to the operator. The plurality of receivers 16 are operatively coupled to the plurality of stimulus generators 18 by control electronics 20.

The casualty tracking method 100 has a detecting step 120 in which the signal 12 emitted by the casualty is detected with the plurality of receivers 16. In instances where the casualty is one casualty of a plurality of casualties, the detecting step detects the signal emitted by each casualty.

In a determining step 130, the casualty tracking method 100 determines the heading of the casualty in the body-centered coordinate system. As discussed above, the heading determination may be based on a differential degradation in the strength of the signal detected by the plurality of receivers 16. The differential degradation may be caused by the body of the operator. If the signals emitted by the casualty contain information related to vital signs, in addition to the heading, the determining step 130 also determines the medical status of each casualty based on the associated vital signs.

A prioritizing step 140 prioritizes the medical status of each casualty based on the severity of the medical status. An associating step 150 associates the directional cue with the casualty having a highest prioritized medical status.

The casualty tracking method 100 has a communicating step 160 in which a directional cue corresponding to the heading is communicated to the operator. The directional cue is generated by one stimulus generator of the plurality of stimulus generators. The communicating step 160 may also communicate to the operator the severity of the medical status as an intensity of the directional cue. As discussed above, in certain applications and environments where audible or visible communications are permissible, the cutaneous communication may be replaced or augmented by audible or visible signals allowing the heading and medical status of each casualty to be communicated to the operator as visible indicators on a visual display.

Yet another embodiment of the present invention is a method for determining a heading of an object emitting a signal having a signal strength. The method comprises creating a two-dimensional, body-centered coordinate system formed by the plurality of receivers. Each receiver is able to receive the signal from the object. The plurality of receivers are operatively coupled by control electronics. Another step in the method comprises producing with the control electronics a directional cue corresponding to the heading of the object based on the strength of the signal received by each of the plurality of receivers.

Another aspect of the invention is a method for determining a direction of an emitter attached to an object of interest. The method comprises a positioning step in which an adjoining pair of spaced apart receivers 16 is positioned proximal to an object causing a signal interference with a radio frequency signal 12 detectable by each receiver of the adjoining pair. The radio frequency signal 12 is associated with an emitter 22 attached to an object of interest. The spaced apart receivers are operatively coupled by control electronics 20. In a determining step, the control electronics 20 determines a direction of the emitter 22 based on the signal interference.

PCT/US2007/020473 filed Sep. 21, 2007, entitled "Apparatus and Method for Non-invasive Thoracic Radio Interrogation"; U.S. patent application Nos. 60/846,403 entitled "Method and Apparatus for Non-Invasive Bio Impedance Determination", filed Sep. 21, 2006; U.S. Provisional application No. 60/846,402 entitled "Method for Conditioning Radio Signal Returns from Thoracic Components for Extractions of Cardiopulmonary Data", filed Sep. 21, 2006; U.S. Provisional application No. 60/973,985, entitled "Apparatus and Method for Non-Invasive Thoracic Radio Interrogation", filed Sep. 20, 2007; PCT/US2007/020487 filed Sep. 21, 2007 entitled "Method for Processing Thoracic Reflected Radio Interrogation Signals"; U.S. Patent Application No. 60/846,404 entitled "Method of Processing Thoracic Reflected Radio Interrogation Signals", filed Sep. 21, 2006; U.S. Patent Application No. 60/973,988 entitled "Method of Processing Thoracic Reflected Radio Interrogation Signals", filed Sep. 20, 2007; PCT/US2007/020492 filed Sep. 21, 2007, entitled "Antenna for Thoracic Radio Interrogation"; U.S. Provisional application No. 60/846,408 entitled "Transducer-antenna-probe for Thoracic Radio Interrogation", filed Sep. 21, 2006, and U.S. Provisional Application No. 60/910,394, entitled "Antenna for Thoracic Radio Interrogation", filed Apr. 5, 2007, and U.S. Provisional Application No. 60/973,970, entitled "Antenna for Thoracic Radio Interrogation", filed Sep. 20, 2007, are also all incorporated by reference herein in their entireties.

Those skilled in the art will appreciate that changes could be made to the embodiments described above without departing from the broad inventive concept thereof. Therefore, the wearable relative positioning system and method are not limited to the particular embodiments disclosed. Rather, the specification is intended to expressly or inherently cover modifications within the spirit and scope of the present invention as defined by the appended claims.

We claim:

1. A relative positioning system comprising:
   an adjoining pair of spaced apart receivers positioned proximal to an object causing a signal interference with a radio frequency signal detectable by each receiver of the adjoining pair, the radio frequency signal associated with an emitter; and
   control electronics operatively coupling the spaced apart receivers, the control electronics configured to determine a direction of the emitter based on the signal interference;
   wherein the emitter is an electronic tag attached to a separate object of interest;
   wherein the adjoining pair of receivers is provided by two of a plurality of spaced apart radio frequency receivers, each radio frequency receiver being able to receive the radio frequency signal from the electronic tag attached to the separate object of interest;
   wherein the control electronics is configured to produce a directional cue corresponding to the heading of the separate object of interest based on the strength of the radio frequency signal received by each of the plurality of receivers; and
   wherein the directional cue is determined by a trigger algorithm based on a differential degradation in the strength of the signal detected by the plurality of receivers, the differential degradation caused by the signal interference.

2. The relative positioning system of claim 1, wherein at least one of the spaced apart receivers has shielding that increases the signal interference.

3. The relative positioning system of claim 1, wherein a portion of the object causing signal interference is a material that interferes with the radio frequency signal.

4. A method of using the relative positioning system of claim 1 for determining a relative position comprising the steps of:
   positioning the plurality of spaced apart receivers around the object causing a signal interference with a radio frequency signal detectable by each receiver of the plurality; and
   determining a direction of the emitter based on the signal interference.

5. The relative positioning system of claim 1 wherein the differential degradation is enhanced by shielding proximal to at least one of the receivers of the plurality of receivers.

6. The relative positioning system of claim 1 wherein at least one receiver of the plurality of receivers is further configured to interrogate the electronic tag, and the radio frequency signal is emitted by the electronic tag in response to the interrogation.

7. A relative positioning system for determining a heading of an object emitting a signal having a signal strength, the system comprising:
   a plurality of receivers, each receiver able to receive the signal from the object;
   a two-dimensional, body-centered coordinate system formed by the plurality of receivers; and
   control electronics operatively coupling the plurality of receivers, the control electronics being configured to produce a directional cue corresponding to the heading of the object based on the strength of the signal received by each of the plurality of receivers;
   wherein the plurality of receivers are positioned around a body causing an interference with the signal, the body interfering with the signal whenever the body extends between any receiver of the plurality and the object emitting the signal; and
   wherein the directional cue is determined by a trigger algorithm based on a differential degradation in the strength of the signal detected by the plurality of receivers, the differential degradation caused by the signal interference.

8. The relative positioning system of claim 7, wherein the signal is a radio frequency signal and the differential degradation is enhanced by shielding proximal to at least one of the receivers of the plurality of receivers.

9. The relative positioning system of claim 7, wherein the signal is a radio frequency signal emitted by an electronic tag attached to the object, at least one receiver of the plurality of receivers is configured to interrogate the electronic tag, and the signal is emitted in response to the interrogation.

10. The relative positioning system of claim 7, wherein the heading is determined relative to the body, and the system further comprises:
    an article attachable to the body; and
    a plurality of stimulus generators supported by the article, each stimulus generator able to generate a stimulus perceptible to an operator,
    wherein the plurality of receivers are supported by the article; and
    the directional cue is produced by one stimulus generator of the plurality of stimulus generators.

11. The relative positioning system of claim 10, wherein the plurality of receivers and the plurality of stimulus generators are uniformly spaced with a separate stimulus generator of the plurality of stimulus generators positioned between each adjoining pair of receivers of the plurality of receivers.

12. The relative positioning system of claim 10, wherein the article is a belt.

13. A method of using the relative positioning system of claim 7 for determining a heading of the object, the method comprising the steps of:
    forming the two-dimensional, body-centered coordinate system with the plurality of receivers by positioning the plurality of receivers around the body causing a signal interference to locate an origin of body-centered coordinate system within the body; and
    producing with the control electronics the directional cue corresponding to the heading of the object based on the strength of the signal received by each of the plurality of receivers positioned around the body.

14. A relative positioning system for determining a heading of an object emitting a signal having a signal strength, the system comprising:
    a plurality of receivers, each receiver able to receive the signal from the object;
    a two-dimensional, body-centered coordinate system formed by the plurality of receivers; and
    control electronics operatively coupling the plurality of receivers, the control electronics being configured to produce a directional cue corresponding to the heading of the object based on the strength of the signal received by each of the plurality of receivers;
    wherein the object is a casualty having vital signs, the signal encodes information representing the vital signs, the control electronics further comprises an operator interface including a visible display and is configured to provide a visible heading indicator and a visible vital sign indicator.

15. The relative positioning system of claim 14, wherein the control electronics are further configured to determine a medical status of the casualty and to provide a visible medical status indicator.

16. The relative positioning system of claim 15, wherein the casualty is one casualty of a plurality of casualties, and the control electronics is configured to communicate the heading and medical status of each casualty of the plurality of casualties.

* * * * *